(12) United States Patent
Sindia

(10) Patent No.: US 9,654,846 B2
(45) Date of Patent: May 16, 2017

(54) SENSOR BASED SIGNAL TRANSMISSION METHODS AND APPARATUSES

(71) Applicant: Intel Corporation, Santa Clara, CA (US)

(72) Inventor: Suraj Sindia, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 14/721,879

(22) Filed: May 26, 2015

(65) Prior Publication Data

US 2016/0353184 A1    Dec. 1, 2016

(51) Int. Cl.
*H04Q 9/00*    (2006.01)
(52) U.S. Cl.
CPC ........... *H04Q 9/00* (2013.01); *H04Q 2209/40* (2013.01); *H04Q 2209/823* (2013.01)
(58) Field of Classification Search
CPC ........................................................ H04Q 9/00
USPC .................................................... 340/870.39
See application file for complete search history.

(56) References Cited

U.S. PATENT DOCUMENTS

| | | | |
|---|---|---|---|
| 8,319,170 B2 | 11/2012 | Alameh et al. | |
| 2004/0040948 A1 | 3/2004 | Mandell et al. | |
| 2006/0139034 A1 | 6/2006 | Nevermann | |
| 2008/0065290 A1* | 3/2008 | Breed | G01L 17/00 701/31.4 |
| 2010/0268056 A1 | 10/2010 | Picard et al. | |
| 2011/0019824 A1* | 1/2011 | Sattiraju | H04L 63/0428 380/270 |
| 2015/0123815 A1* | 5/2015 | Mejegard | G06Q 10/06 340/870.07 |

FOREIGN PATENT DOCUMENTS

WO    9829969 A2    7/1998

OTHER PUBLICATIONS

International Search Report and Written Opinion mailed Jul. 22, 2016, issued in corresponding International Application No. PCT/US2016/027163, 11 pages.

* cited by examiner

*Primary Examiner* — Qutbuddin Ghulamali
(74) *Attorney, Agent, or Firm* — Schwabe, Williamson & Wyatt, P.C.

(57) ABSTRACT

Embodiments of the present disclosure provide techniques and configurations for a signal transmission for an apparatus, such as a mobile or wearable device, based on sensor fail-safety. In one instance, the apparatus may comprise a transmitter to transmit a communication signal of the apparatus at a first power level, a sensor to monitor a process that is external to the apparatus and to provide an output signal indicating a change in a state of the process, and a control module communicatively coupled with the sensor and transmitter, to determine whether the output signal provided by the sensor has indicated a change in the external process over a threshold time period, and, based on a result of this determination, cause the transmitter to switch the transmission from the first power level to a second power level that is lower than the first power level. Other embodiments may be described and/or claimed.

20 Claims, 6 Drawing Sheets

SENSOR BASED SIGNAL TRANSMISSION METHODS AND APPARATUSES

FIELD

Embodiments of the present disclosure generally relate to the field of sensor-equipped devices, and more particularly, to techniques for signal transmission using fail-safety techniques applied to sensors associated with the device.

BACKGROUND

A variety of sensors is commonly used in sensor hubs for user devices, such as smartphones, tablet computers, "2 in 1" mobile computing devices, or wearable devices. For example, proximity sensors, gyroscopes, temperature sensors, heart rate sensors, and the like may be used in these user devices.

The role of sensors in the user devices may often involve detecting a change in a state of a particular process that may be external to the user device. For example, a proximity sensor in a mobile computing device may detect the presence of human tissue (like a hand, finger, or face, among others) when it is closer than a specific threshold distance mandated by governmental agencies, such as Federal Communications Commission (FCC) and/or European Conformity (CE) regulations. Typically, upon the sensor's detection of human tissue in unsafe proximity to the user device, the circuitry controlling the user device's transmitter that includes radio frequency (RF) power amplifier gain, may turn the power amplifier down (or off), ensuring the RF power radiated by the device does not damage the detected human tissue.

Upon failure of a proximity sensor either due to a manufacturing defect or any environmentally-induced effect in-field, the detection of human tissue may no longer be possible. Currently available solutions rely on the assumption that a sensor, such as a proximity sensor, may always work. As a result, in the event of either a proximity sensor failure or a failure in the communication channel between the proximity sensor and the processor running the operating system of a mobile device, while the RF power amplifier is configured to be operating in a high-power output mode, the presence of a human tissue within the FCC or CE mandated threshold distance may be undetected. Consequently, the RF power emitted by the mobile device may remain high even when the human tissue is closer than the mandated threshold distance, thereby violating FCC and CE regulations and increasing the risk of serious bodily injury due to long-term radio frequency power exposure of the human tissue of the user.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
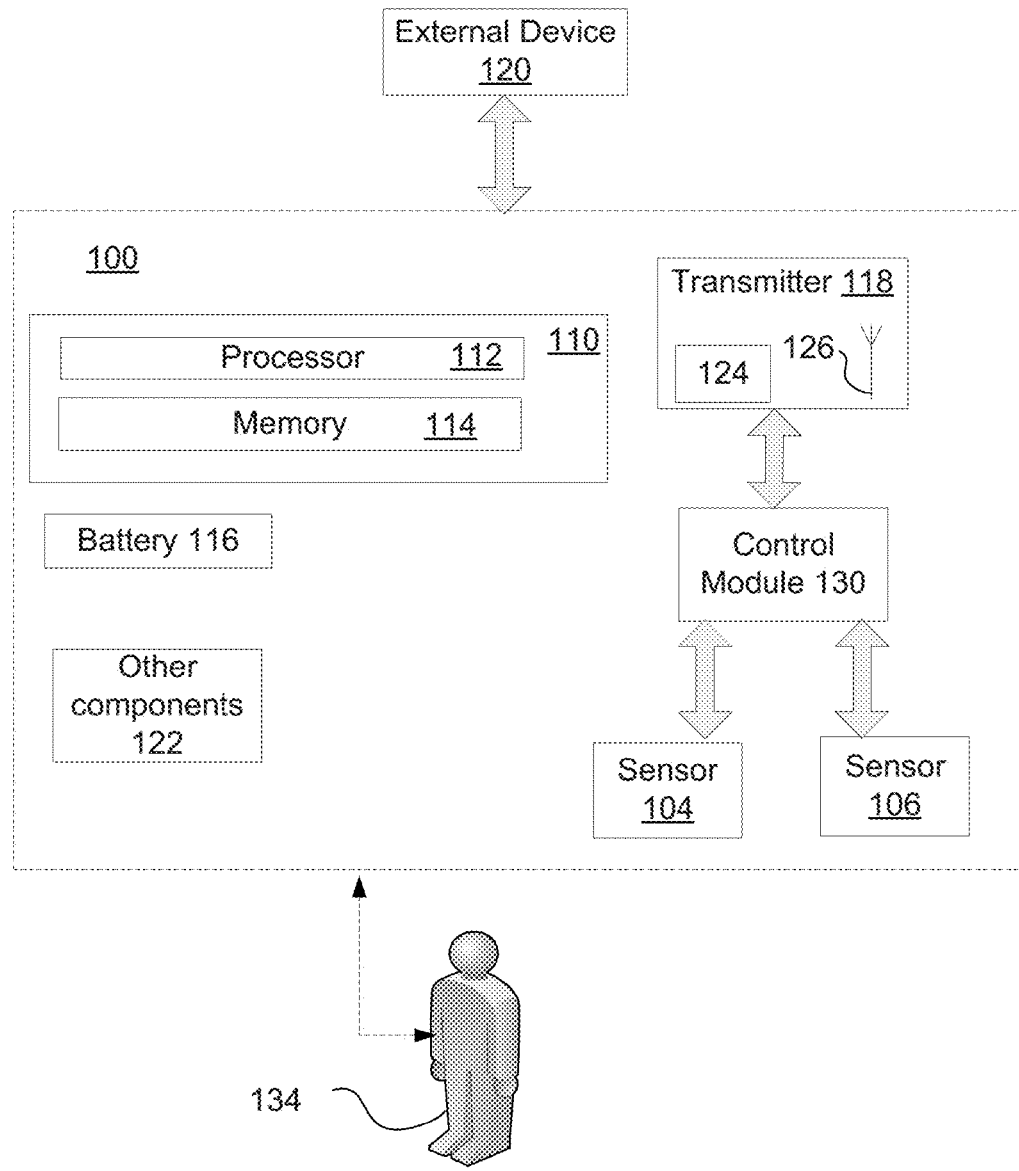
FIG. 1 is a block diagram illustrating an example apparatus incorporated with the teachings of the present disclosure, in accordance with some embodiments.

Embodiments of the present disclosure include techniques and configurations for a communication signal transmission for an apparatus, such as a mobile or wearable device. In accordance with embodiments, the apparatus may comprise a transmitter to transmit a communication signal of the apparatus at least at a first power level, a sensor to monitor a process that is external to the apparatus and to provide an output signal indicating a change in a state of the process, and a control module communicatively coupled with the sensor and the transmitter. The control module may be configured to determine whether the output signal provided by the sensor has indicated a change in the external process over a threshold time period. Based at least in part on a result of this determination, the control module may cause the transmitter to switch the transmission of the communication signal from the first power level to a second power level that is lower than the first power level.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

FIG. 1 is a block diagram illustrating an example apparatus 100 incorporated with the teachings of the present disclosure, in accordance with some embodiments. The apparatus 100 may comprise a mobile device (e.g., a tablet computer, a smartphone, a 1-in-2 computing device, and the like) or a wearable device configured to be attachable to a user's body in order to conduct measurements associated with the functioning of the user's body and user's activities.

The apparatus 100 may include one or more (e.g., a plurality of) sensors 104, 106. The sensors 104, 106 may be configured to monitor a process that is external to the apparatus 100 and to provide an output signal indicating a change in a state of the process. For example, in some embodiments, e.g., where the apparatus 100 comprises a wearable device, the sensors 104, 106 may provide readings related to external process, such as various user body functions. More specifically, the sensors 104, 106 may include, but may not be limited to, electromyography (EMG) sensors, temperature sensors, sweat chemical sensors, motion sensors, optical photodiodes, electrocardiogram (ECG) electrodes, galvanic skin response (GSR) sensors, piezo crystals, pressure sensors, or the like.

In some embodiments, e.g., where the apparatus 100 comprises a mobile device, one of the sensors 104, 106 may be a proximity sensor configured to monitor an external process such as presence of an object, e.g., human tissue, to the apparatus 100, and detect the presence of the human tissue within a distance that may be mandated by regulatory agencies to be unsafe.

It should be noted that sensors 104, 106, are shown in FIG. 1 for illustration only and are not limiting the implementation of apparatus 100. It will be appreciated that any number or types of sensors may be used in the apparatus 100.

In some embodiments, the apparatus 100 may include a processing unit 110 having a processor 112 and memory 114 having instructions that, when executed on the processor 112, may cause the processor 112 to perform tasks of the apparatus 100, some of which are described below in reference to FIG. 5. The apparatus 100 may include a battery 116 configured to provide power supply to the apparatus 100 and, more generally, to the components of the apparatus 100.

The apparatus 100 may include a transmitter 118 to transmit a communication signal provided by the apparatus 100 to different destinations, such as to an external device 120 (e.g., mobile or stationary computing device). The transmitter 118 may include circuitry configured to provide communication signal transmission at a desired power level, for example, a power amplifier 124 and antenna 126. In embodiments, the communication signal may include, for example, data resulting from processing the sensor readings, or any other type of data to be communicated by the apparatus 100. The communication signal of the apparatus 100 may comprise a radio frequency (RF) communication signal.

The apparatus 100 may include other components 122 necessary for the functioning of the apparatus 100. For example, other components 122 may include communications interface(s) to enable the apparatus 100 to communicate over one or more wired or wireless network(s) and/or with any other suitable device, such as external device 120. The other components 122 may be further configured to perform signal pre-processing before transmission of sensed signals via the transmitter 118, such as de-noising, feature extraction, classification, data compression, and the like.

To enable signal communication at a desired power level, the apparatus 100 may include a control module 130 communicatively coupled with the sensors 104 and 106 and the transmitter 118, and configured to control the power of the communication signal provided by the amplifier 124 to the antenna 126. The control module 130 may have hardware or software implementation, or a combination thereof. The control module 130 may be configured to determine whether the output signal provided by the sensors 104, 106 has indicated a change in the external process over a threshold time period, and cause the transmitter 118 to switch the transmission of the communication signal from the first power level to a second power level that is lower than the first power level, based at least in part on a result of that determination.

In some embodiments, the second power level may be health-safe, e.g., within output signal power range mandated by governmental regulatory agencies (e.g., FCC or CE) for mobile devices, in order to reduce or eliminate the risk of bodily injury of a user 134 of the apparatus 100 due to continuous exposure to radio waves associated with communication signal transmission. For example, the sensor 104 (or 106) may be a proximity sensor configured to detect proximity of human tissue to the apparatus 100. If the sensor 104 detects a presence of human tissue in proximity to the apparatus 100 that is below a threshold distance, the sensor 104 may provide an output signal (or change in the output signal) indicating the detection of such event. The control module 130 may receive the output signal from the sensor 104 indicating the detection of presence of human tissue to the apparatus, and control the transmitter 118 to turn off the power amplifier 124 entirely or cause the power amplifier 124 to switch signal transmission to a safe power level (e.g., the level mandated by regulatory agencies for the apparatus 100).

The control module 130 may be further configured to enable the communication signal transmission by the transmitter 118 using the sensor fail-safety techniques described herein. For example, if the sensor 104 is faulty, the sensor may not detect a presence of the human tissue in dangerous proximity to the apparatus or may not report the detected presence in the output signal. The control module 130 may be configured to determine whether the output signal provided by the sensor 104 has indicated a change in the external process over a threshold time period. If the output signal from the sensor 104 has not indicated a change in the process (e.g., proximity event) over the threshold time period, it may be assumed that the sensor 104 is faulty. Accordingly, the control module 130 may control the transmitter 118 to turn off the power amplifier 124 entirely or to cause the power amplifier 124 to switch the signal transmission to the safe power level.

In another example, periodic or continuous ambient or body temperature measurements may be conducted by the sensors associated with the apparatus 100, e.g., a wearable device. In some applications, periodic changes in temperature may be expected. One example of such application may be a burn-in chamber for integrated circuits running through a specified temperature profile. Another example may be body temperature measurements with a wearable or mobile device, in which body temperature is expected to change (e.g., from daytime temperature corresponding to a user's active time to nighttime temperature corresponding to a user's sleeping time). If the temperature sensor fails, the sensor may not report in its output signal a change in temperature for a threshold period of time, which may be longer than an average temperature change time period for a particular application. Accordingly, it may be assumed that the temperature sensor is faulty. If the signal transmission by the apparatus 100 is related to providing temperature readings, the control module 130 may control the transmitter 118 to turn off signal transmission entirely or switch signal transmission to a lower power level, to conserve battery 116 power.

In general, the threshold time period during which a sensor may have detected no change in the measured process (which may indicate that the sensor is faulty) may vary depending on device type, method of use, user preferences, particular market segment, and other factors. The threshold time period may be determined using statistical analysis of typical use of the apparatus 100 or group of similar devices over a particular time period. For example, information comprising history of use of apparatus 100 (e.g., mobile devices or wearable devices) may be gathered and analyzed. Such information may include statistical data gathered over a period of time (e.g., a month, a year, or the like) about the time periods during which devices of a given type stayed in idle or sleep mode (e.g., not in use), and time periods of active use of these devices. Such information may further include statistical data gathered over a period of time about a ratio of faulty sensors to healthy sensors in devices of a particular type. Based on the gathered information, threshold time periods corresponding to the highest probability of a presence of a faulty sensor in the device may be determined. The threshold time period determination may be further based, for example, on a given market segment, device type, user group, or a combination of these and/or other factors.

Techniques for health-safe power level signal transmission or power conservation as described above may be provided for wearable or mobile devices with sensors measuring a user's body motion, sweat, ambient light, electrocardiogram (ECG), pressure (e.g., atmospheric or foot pressure), and the like.

In some embodiments, the apparatus 100 may include more than one sensor, for example, a plurality of sensors, such as sensors 104, 106 as described above. These multiple sensors associated with apparatus 100 may be configured to monitor the same external process and provide respective output signals indicating a change in a state of the process. The control module 130 may poll the output signals from the sensors 104, 106 at least over the threshold time period and determine respective statuses of the sensors 104, 106 based at least in part on a result of the poll.

For example, apparatus 100 may include three proximity sensors. If one of the proximity sensors has failed, two remaining sensors may still give the same output signal corresponding to the same reading, and one failed sensor may give a differing output signal. In this case, it may be assumed that at least one sensor out of three has failed based on the "majority" readings, and the other two sensors are providing correct readings. If all three sensors give the same output signal over a threshold period of time, it may be assumed that the sensors provide correct readings and are not faulty, or all three sensors are faulty, based on the "majority" readings. If all three sensors are providing different output signals, it may be assumed that either all three sensors or at least two sensors have failed. Accordingly, depending on a particular application, the control module 130 may control the transmitter 118 to turn off signal transmission or switch signal transmission to a lower (e.g., safe) power level as described above.

A numeric example of the apparatus 100's signal transmission based on sensor fail-safety enabled by the control module 130 is provided below. Let us assume that the chance of a proximity sensor 104's failure in the apparatus 100 (e.g., a mobile device) is 0.5. Let us further assume that each time the proximity sensor 104 fails, the resulting failure may trigger the power amplifier 124 to provide an unsafe power level 50% of the time. The chance of a functionally fail-unsafe operation of the apparatus 100 without the fail-safe signal transmission provided by the control module 130 may become $0.5*50\%=0.5*0.5=0.25=25\%$.

Let us assume the same numbers apply for failure probabilities for the apparatus 100 having a fail-safe sensor logic enabled by the control module 130. Let us attribute a fail rate of 0.01 for the control module 130 (implemented as digital logic circuitry or software application) used to monitor the proximity sensor 104 status. Such assumption may be presumed fair because the digital logic or software implementation tend to be more robust (e.g., fail-safe) than the sensor, for example, by an order of magnitude. Let us further assume that 50% of the times the control module 130 fails in a functionally unsafe state.

The effective chance of fail-unsafe operation of the apparatus 100 having the control module 130 may be calculated as follows: chance of control module 130 failing independent of proximity sensor in a functionally unsafe state plus chance of control module 130 failing in a safe state but coupled with a proximity sensor failure in a functionally unsafe state, which equals $0.01*0.50+0.01*0.50*0.25=0.625\%$, where 0.01 is a fail rate that may be attributed to the digital logic circuitry used to monitor the proximity sensor status. This is a fair assumption since the digital logic tends to be much more robust than the proximity sensor.

Accordingly, the chance of fail-unsafe operation of a mobile or wearable device may decrease from 25% in a conventional apparatus to less than 1%, (e.g., 0.625%) in the apparatus 100 having the control module 130 as described above. In other words, approximately a 25-times improvement in functional fail-safety of the apparatus 100 may be achieved.

Figure 2:
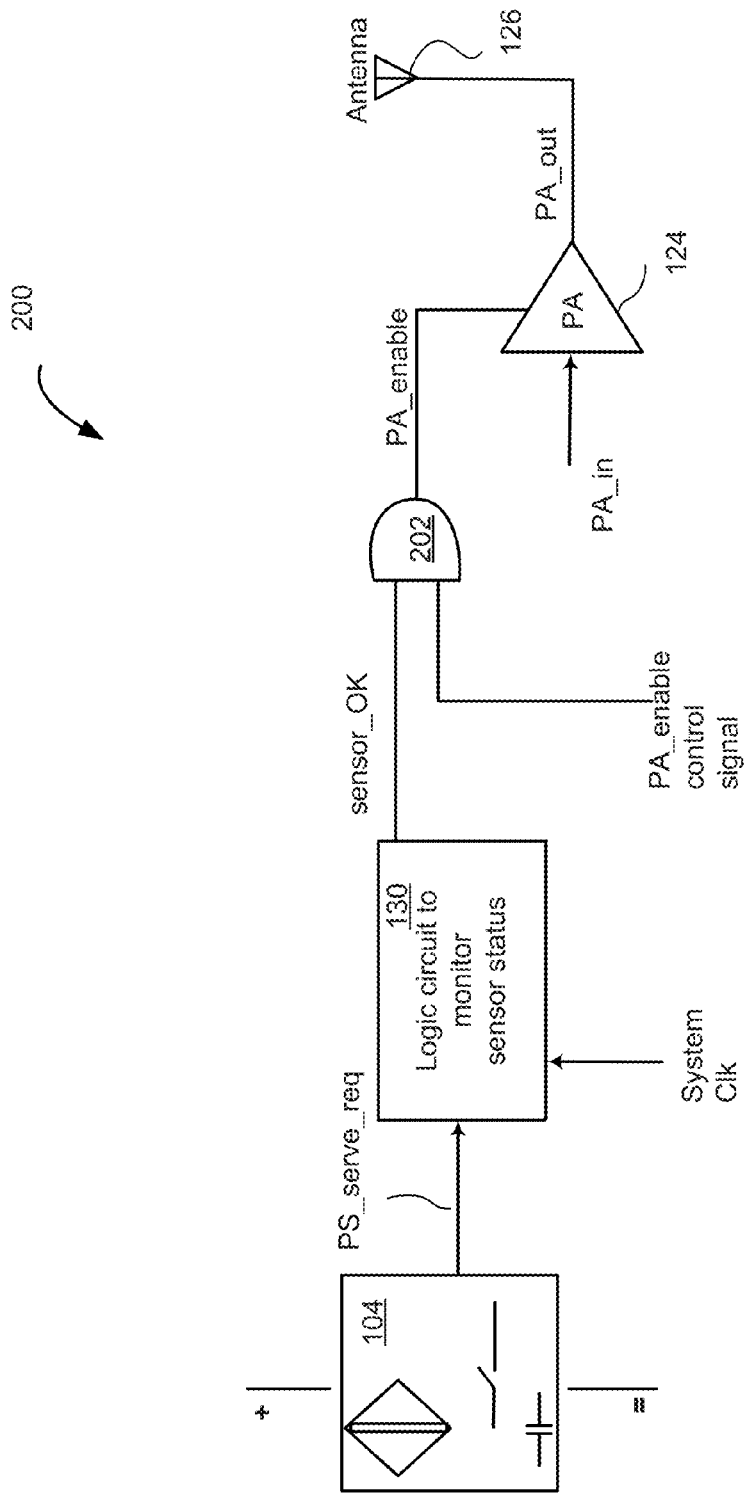
FIG. 2 is a schematic diagram of an example implementation of a circuitry configured to provide communication signal transmission for an apparatus based on sensor fail-safety, in accordance with some embodiments.

FIG. 2 is a schematic diagram of an example implementation of a circuitry configured to provide communication signal transmission for an apparatus based on sensor fail-safety, in accordance with some embodiments. More specifically, the schematic diagram of FIG. 2 illustrates an example apparatus 200 comprising an example of at least partial implementation of the apparatus 100 of FIG. 1. For simplicity purposes, like components of FIGS. 1 and 2 may be enumerated with like numerals.

As shown, the apparatus 200 may include a sensor 104, such as a proximity sensor that may be sensitive to solid states, coupled with a logic circuit to monitor sensor status, such as control module 130. The proximity sensor 104 may provide an output signal, such as Proximity Sensor Service Request (PS_serv_req), which may be input into the control module 130. PS_serve_req signal may indicate a status of the sensor 104. A healthy status of the sensor 104 may be indicated by a state of PS_serve_req signal (e.g., logical high or logical low). If the signal state remains the same over a period of time that is below a threshold time period described above, the control module 130 may provide a signal sensor_OK to an AND logic gate 202. Another input signal to the AND logic gate 202 may be a PA_enable control signal.

In embodiments, the PA_enable control signal may be a function of PS_serv_req. For example, if the proximity sensor 104 is in a working state, then the signal sensor_OK may be a logical high. When a human tissue comes close to the proximity sensor 104, the sensor 104 may detect a proximity event and issue a PS_serv_req signal. The proximity event may be a presence of human tissue at an unsafe distance to the apparatus 200. The active state of the PS_serv_req signal may be needed to disable the power amplifier 124 of the transmitter (not shown in its entirety) of the apparatus 200. Accordingly, the PA_enable control signal at the input of the AND logic gate 202 may be an inverse function of the PS_serv_req signal.

In the absence of a detection of a proximity event by the sensor 104 over the time period below the threshold, the control module 130 may issue a sensor_OK signal, to enable the passing of the PA_enable signal to the power amplifier 124. The PA_enable signal may control the input communication signal P_in to be amplified by the power amplifier 124, to produce an output signal PA_out that may be fed to the antenna 126 for transmission.

For example, a change from a logical high state to a logical low state of PS_serve_req (or vice versa) may indicate a detection of a proximity event by the sensor 104. This control module 130 may send the signal sensor_OK to the AND logic gate 202, which in turn may gate the PA_enable signal. If no proximity event has been detected over the time period above the threshold, the sensor_OK signal may gate the PA_enable signal from passing to the power amplifier 124 and enabling provision of the PA_out signal to the antenna 126. The threshold time period may be counted by the control module 130 using, for example, a system clock, via a signal System Clk as shown in FIG. 2.

The PA_enable signal may control the power gain that may be added by the power amplifier 124 to the RF communication signal before being transmitted through the antenna 126. In the example illustrated in FIG. 2, the PA_enable signal, if gated, may shut off the power amplifier 124.

In some embodiments, the PA_enable signal may serve as a selection line of a two-input multiplexer to enable choice of one of multiple, e.g., at least two different gains of the power amplifier to the incoming signal PA_in. The gains may correspond to different (e.g., first and second) power levels of the RF communication signal that the control module 130 may be configured to control based on sensor fail-safety techniques described herein.

Figure 3:
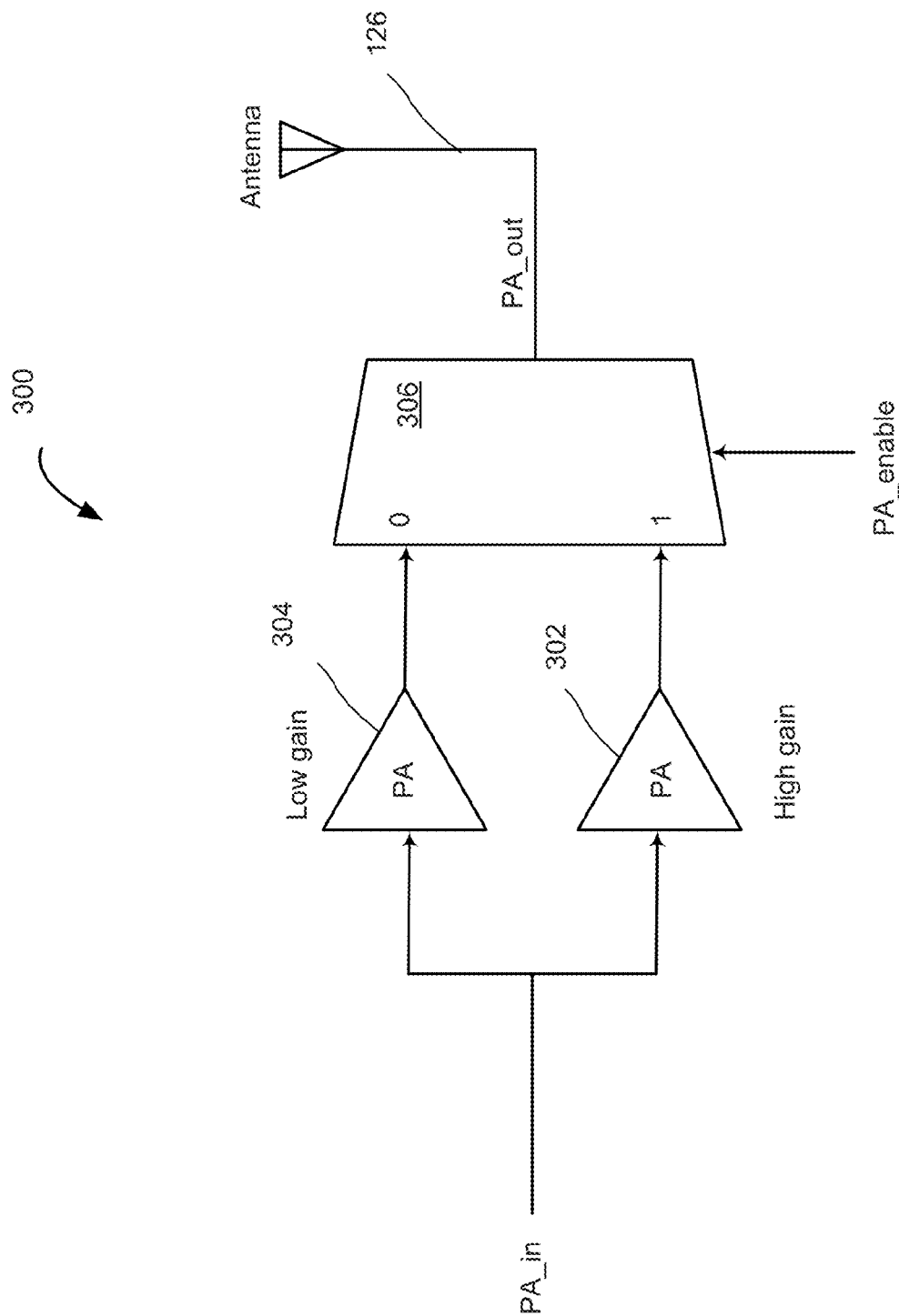
FIG. 3 is a schematic diagram of an example implementation of a power amplifier of the apparatus of FIGS. 1 and 2 configured to provide multiple (e.g., at least two) power levels for signal transmission by the apparatus, in accordance with some embodiments.

FIG. 3 is a schematic diagram of an example implementation of a power amplifier of the apparatus of FIGS. 1 and 2 configured to provide multiple (at least two) power levels for signal transmission by the apparatus, in accordance with some embodiments. As shown, the example power amplifier 300 may include an amplifier 302 configured to provide high gain (first power level P1) and amplifier 304 configured to provide low gain (second power level P2 that is lower than the first power level P1). The amplifier input signal PA_in may be provided to the amplifiers 302 and 304, as shown. The respective output signals P1 and P2 may be provided to a multiplexer 306, controlled by PA_enable signal described in reference to FIG. 2. When PA_enable=1 (logical high), a high gain amplifier 302 output P1 may be selected and become available at amplifier output PA_out. When PA_enable=0 (logical low), a low gain amplifier 304 output P2 may be selected and become available at PA_out.

Figure 4:
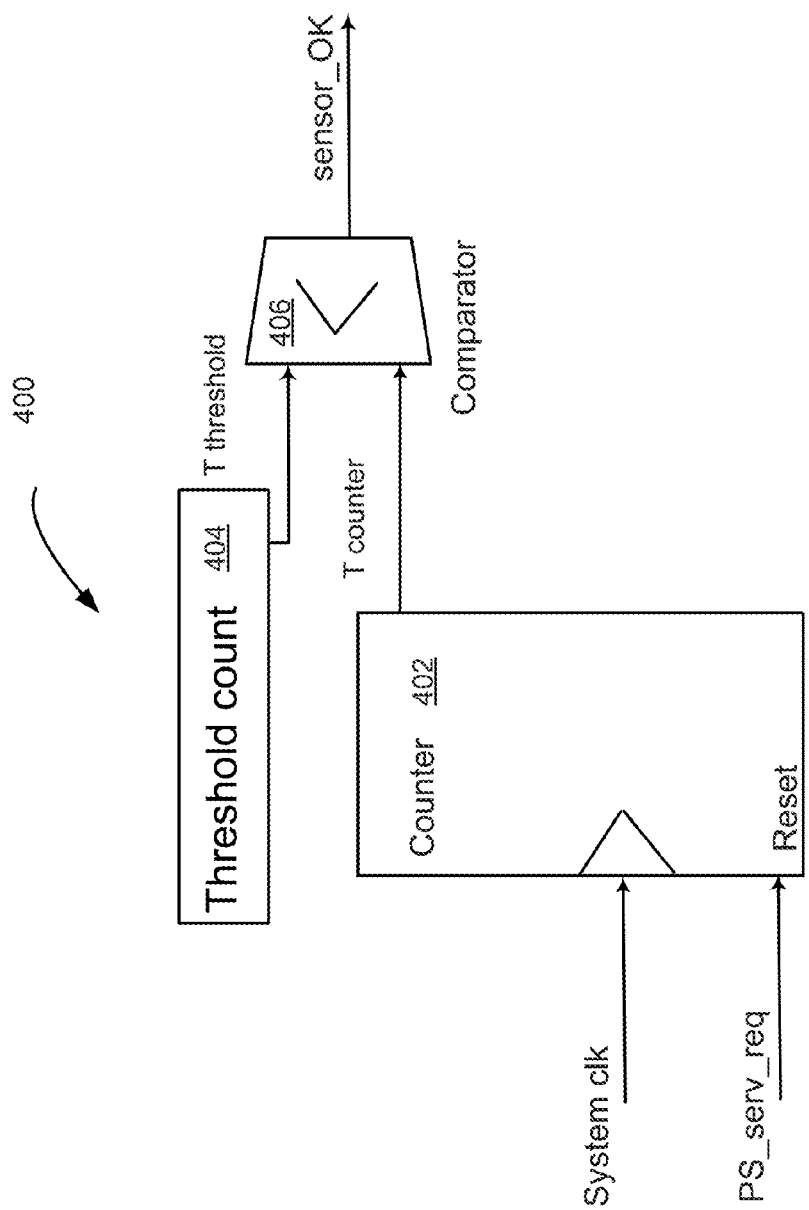
FIG. 4 is a schematic diagram of an example circuitry implementation of a control module of an apparatus of FIGS. 1 and 2, in accordance with some embodiments.

FIG. 4 is a schematic diagram of an example circuitry implementation 400 of a control module of an apparatus of FIGS. 1 and 2, in accordance with some embodiments. As shown, the circuitry implementation 400 may include a counter 402, into which signals System Clk and PS_serv_req described in reference to FIG. 2 may be inputted. The counter 402 may provide a time period T counter within which the signal PS_serv_req has not changed. Threshold count (e.g., threshold time period data value T threshold) may be stored in memory (e.g., non-volatile memory) 404. The counter time period value T counter and the threshold count value T threshold may be inputted to the comparator 406 that generates sensor_OK signal to the AND logic gate 202 as described in reference to FIG. 2, until the T counter value reaches the threshold value T threshold. After the T counter value reaches the threshold value T threshold, the comparator 406 cancels the sensor_OK signal, effectively shutting off the PA_enable signal that controls the power amplifier 124 output, as described in reference to FIG. 2.

Figure 5:
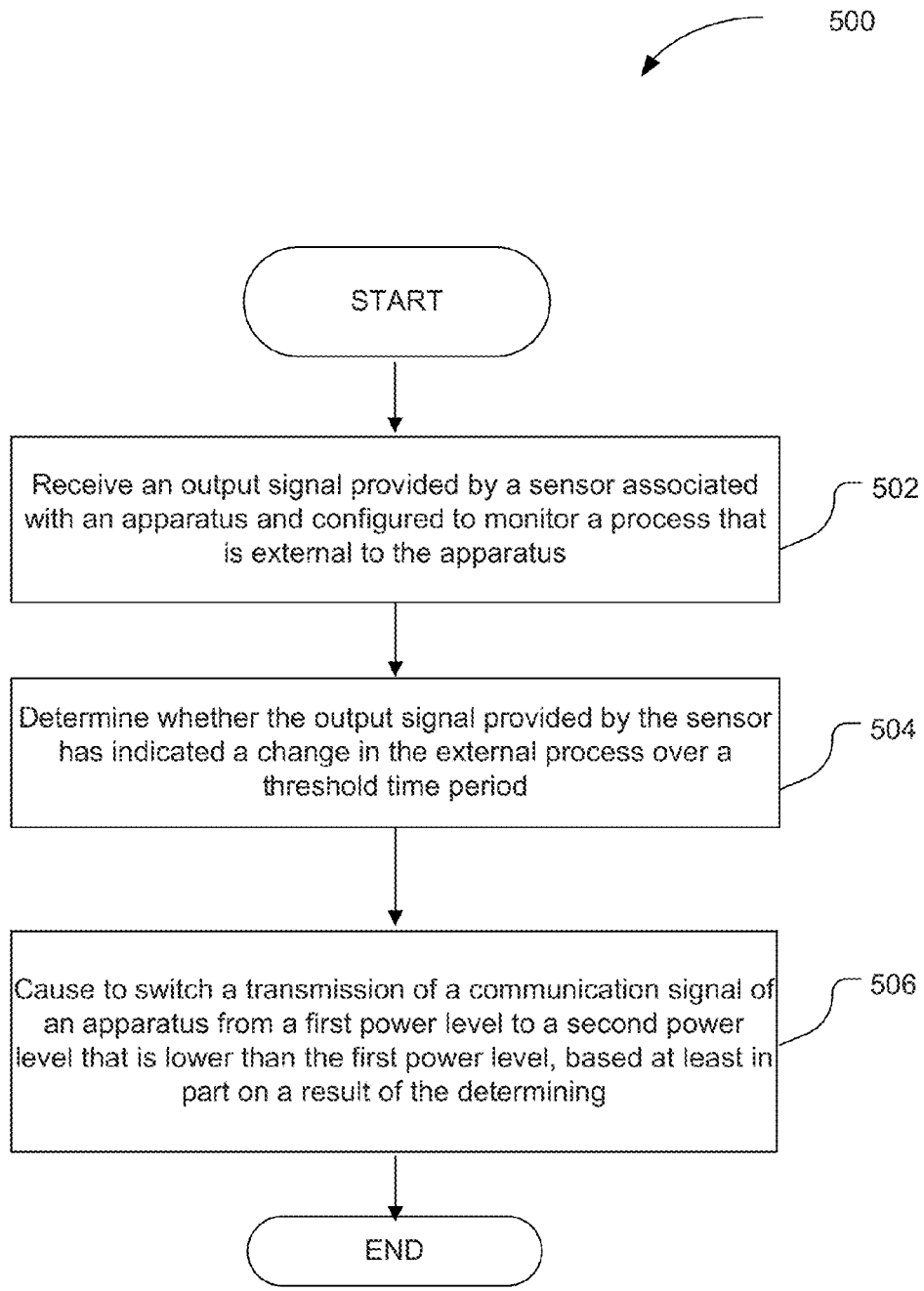
FIG. 5 is a process flow diagram for transmission of a communication signal by an apparatus based on sensor fail-safety, in accordance with some embodiments.

FIG. 5 is a process flow diagram for transmission of a communication signal by an apparatus based on sensor fail-safety, in accordance with some embodiments. The process 500 may comport with some of the apparatus embodiments described in reference to FIGS. 1-4. In alternate embodiments, the process 500 may be practiced with more or fewer operations, or a different order of the operations. In embodiments, the process may be implemented as a control module 130 of FIG. 1.

The process 500 may begin at block 502 and include receiving, by a control module of an apparatus that includes a transmitter to transmit a communication signal and a sensor to monitor a process that is external to the apparatus, an output signal provided by the sensor. The apparatus may be configured to transmit a communication signal that may include an RF communication signal.

At block 504, the process 500 may include determining whether the output signal provided by the sensor has indicated a change in the external process over a threshold time period. The threshold time period may be determined based on information comprising history of use of the apparatus, such as mobile devices or wearable devices.

At block 506, the process 500 may include causing, by the control module, to switch a transmission of a communication signal from a first power level to a second power level that is lower than the first power level, based at least in part on a result of the determination, which may include determining that the output signal provided by the sensor has not indicated a change in the external process over the threshold time period. Causing to switch a transmission of a communication signal from a first power level to a second power level may include disabling a power amplifier of the transmitter or initiating the power amplifier to convert the communication signal from the first power level to the second power level. The second power level may be within output signal power range mandated by a governmental regulatory agency for mobile devices, such as FCC or CE.

Figure 6:
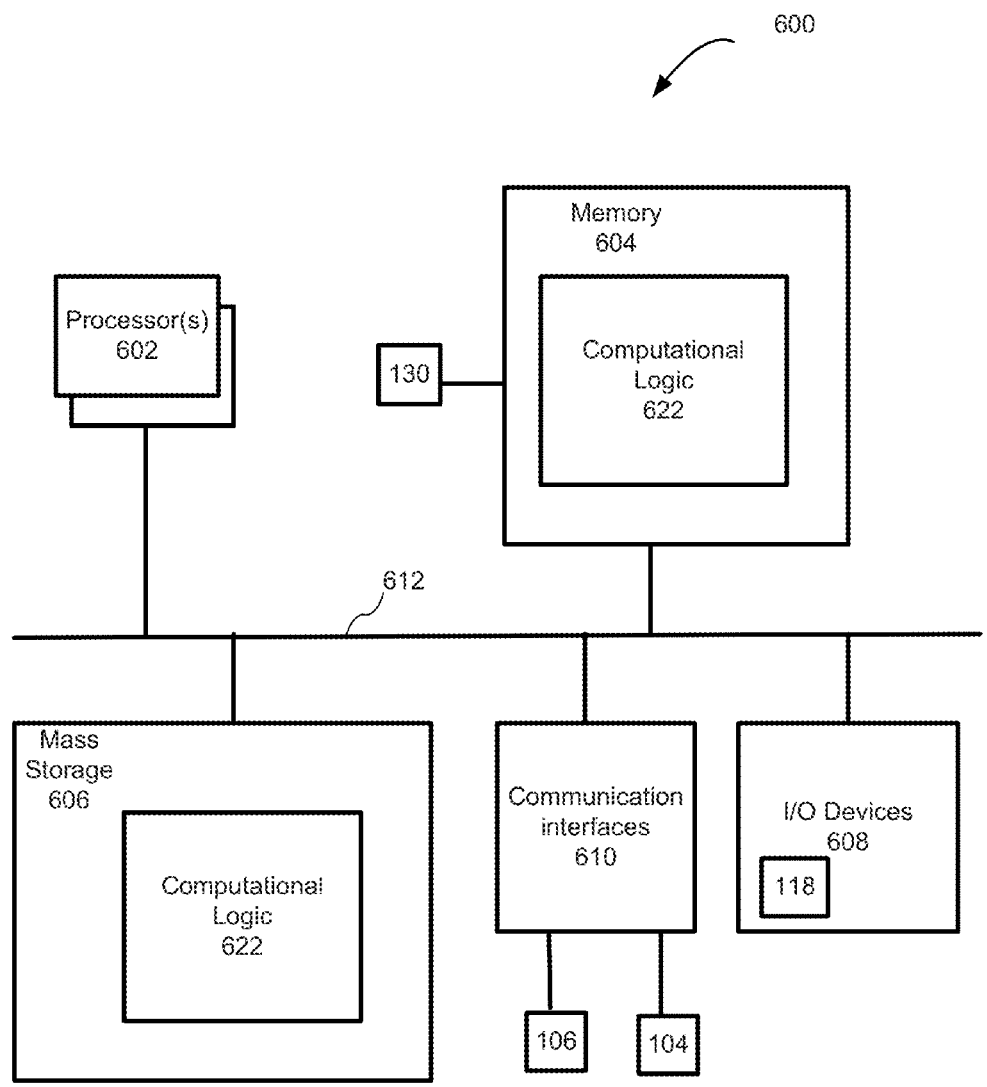
FIG. 6 is an example computing device suitable to be configured as the apparatus of FIGS. 1-4 in accordance with various embodiments.

FIG. 6 is an example computing device 600 suitable to be configured as the apparatus of FIGS. 1-4 in accordance with various embodiments. In some embodiments, various components of the example computing device 600 may be used to configure the apparatus 100. In some embodiments, various components of the example computing device 600 may be used to configure the external device 120.

As shown, computing device 600 may include one or more processors or processor cores 602 and system memory 604. For the purpose of this application, including the claims, the terms "processor" and "processor cores" may be considered synonymous, unless the context clearly requires otherwise. The processor 602 may include any type of processors, such as a central processing unit (CPU), a microprocessor, and the like. The processor 602 may be implemented as an integrated circuit having multi-cores, e.g., a multi-core microprocessor. The computing device 600 may include mass storage devices 606 (such as solid state drives, volatile memory (e.g., dynamic random-access memory (DRAM), and so forth)). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth. System memory 604 and/or mass storage devices 606 may include respective copies of programming instructions configured to perform operations related to apparatus 100, for example, collectively denoted as computational logic 622.

The computing device 600 may further include input/output (I/O) devices 608 (such as a display, soft keyboard, touch sensitive screen, image capture device, and so forth) and communication interfaces 610 (such as network interface cards, modems, infrared receivers, radio receivers (e.g., Near Field Communication (NFC), Bluetooth, WiFi, 4G/6G Long-Term Evolution (LTE), and so forth)).

The communication interfaces 610 may include communication chips (not shown) that may be configured to operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

In embodiments, the computing device 600 may comprise the apparatus 100. For example, the computing device may include sensors 104 and 106, and transmitter 118 coupled with the communication interfaces 610. In some embodiments, the apparatus 100 may be communicatively coupled with the external device 120 implemented as computing device 600 described herein.

The above-described computing device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions implementing the operations associated with the apparatus 100, such as the control module 130 of FIG. 1. The various elements may be implemented by assembler instructions supported by processor(s) 602 or high-level languages that may be compiled into such instructions.

The permanent copy of the programming instructions of computational logic 622 may be placed into mass storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and to program various computing devices.

The number, capability, and/or capacity of the elements 608, 610, 612 may vary, depending on whether computing device 600 is used as a stationary computing device, such as a set-top box or desktop computer, or a mobile computing device, such as a tablet computing device, laptop computer, game console, or smartphone. Their constitutions are otherwise known, and accordingly will not be further described.

At least one of processors 602 may be packaged together with memory having computational logic 622 configured to practice aspects of embodiments described in reference to FIGS. 1-4. For one embodiment, at least one of processors 602 may be packaged together with memory having computational logic 622 configured to practice aspects of process 500 of FIG. 5 to form a System in Package (SiP) or a System on Chip (SoC). For at least one embodiment, the SoC may be utilized in, e.g., but not limited to, a computing device, such as external device 120 of FIG. 1. In another embodiment, the SoC may be utilized to form the apparatus 100 of FIG. 1.

In various implementations, the computing device 600 may comprise a laptop, a netbook, a notebook, an ultrabook, a smartphone, a tablet, an ultra-mobile PC, a mobile phone, or a wearable device. In further implementations, the computing device 600 may be any other electronic device that processes data.

Example 1 is a signal transmission apparatus with fail-safe properties, the signal transmission apparatus comprising: a transmitter to transmit a communication signal of the apparatus at least at a first power level; a sensor to monitor a process that is external to the apparatus and to provide an output signal indicating a change in a state of the process; and a control module communicatively coupled with the sensor and the transmitter, to determine whether the output signal provided by the sensor has indicated a change in the external process over a threshold time period, and cause the transmitter to switch the transmission of the communication signal from the first power level to a second power level that is lower than the first power level, based at least in part on a result of the determination.

Example 2 may include the subject matter of Example 1, wherein the sensor is a proximity sensor, wherein the sensor detects proximity of human tissue to the apparatus, wherein the output signal indicates a proximity of human tissue to the apparatus that is below a threshold distance.

Example 3 may include the subject matter of Example 1, wherein the sensor is selected from one of: heart rate sensor, temperature sensor, or position sensor, wherein the sensor to monitor a process includes to monitor physiological conditions of a user of the apparatus.

Example 4 may include the subject matter of Example 1, wherein the communication signal comprises a radio frequency (RF) communication signal, and wherein the second power level is within an output signal power range mandated by a governmental regulatory agency for mobile devices.

Example 5 may include the subject matter of Example 4, wherein the transmitter includes a power amplifier to convert the RF communication signal from the first power level to the second power level.

Example 6 may include the subject matter of Example 5, wherein the control module comprises circuitry comprising logic to disable the power amplifier or to cause the power amplifier to convert the RF communication signal from the first power level to the second power level, in response to a determination that the output signal provided by the sensor has not indicated a change in the external process over the threshold time period.

Example 7 may include the subject matter of Example 6, wherein the circuitry includes a clock counter to determine the threshold time period within which the sensor has not indicated a change in the external process.

Example 8 may include the subject matter of Example 7, wherein the apparatus is selected from one of: a mobile device or a wearable device, wherein the threshold time period is determined based on information comprising history of use of mobile devices or wearable devices respectively.

Example 9 may include the subject matter of Example 1, wherein the control module is to determine a status of the sensor based on a result of the determination whether the output signal provided by the sensor has indicated a change in the external process over a threshold time period.

Example 10 may include the subject matter of Example 9, wherein the sensor is to detect a change in a state of the process, wherein the change in a state of the process includes a difference in a monitored parameter of the process that is above a predetermined change threshold.

Example 11 may include the subject matter of Example 9, wherein the control module is to determine that a status of the sensor is a failed status, in response to the determination that the output signal provided by the sensor has not indicated a change in the external process over the threshold time period.

Example 12 may include the subject matter of Example 9, wherein the apparatus further comprises at least another sensor to monitor the external process and provide another output signal indicating a change in a state of the process, wherein the control module is to poll the output signal and the other output signal at least over the threshold time period and to determine a status of the sensor and the another sensor based at least in part on a result of the poll.

Example 13 is a fail-safe communication method, comprising: receiving, at a control module of an apparatus that includes a transmitter to transmit a communication signal and a sensor to monitor a process that is external to the apparatus, an output signal provided by the sensor; determining, by the control module, whether the output signal provided by the sensor has indicated a change in the external process over a threshold time period; and switching, by the control module, a transmission of a communication signal from a first power level to a second power level that is lower than the first power level, based at least in part on the output signal received at the control module.

Example 14 may include the subject matter of Example 13, wherein causing to switch a transmission of a communication signal from a first power level to a second power level that is lower than the first power level includes disabling a power amplifier of the transmitter or initiating the power amplifier to convert the communication signal from the first power level to the second power level.

Example 15 may include the subject matter of Example 14, wherein causing to switch a transmission of a communication signal from a first power level to a second power level includes determining, by the control module, that the output signal provided by the sensor has not indicated a change in the external process over the threshold time period.

Example 16 may include the subject matter of Example 14, wherein causing to switch a transmission of a communication signal from a first power level to a second power level includes initiating, by the control module, the transmission of the communication signal at the second power level that is within an output signal power range mandated by a governmental regulatory agency for mobile devices.

Example 17 is one or more non-transitory computing device-readable media having instructions for transmission of a communication signal by a transmitter of a computing device based on sensor fail-safety stored thereon that, in response to execution on the computing device, cause the computing device to: receive an output signal provided by a sensor to monitor a process that is external to the computing device; determine whether the output signal provided by the sensor has indicated a change in the external process over a threshold time period; and cause the transmitter to switch a transmission of a communication signal from a first power level to a second power level that is lower than the first power level, based at least in part on a result of the determination.

Example 18 may contain the subject matter of Example 17, wherein the instructions that cause the computing device to initiate the transmitter to switch a transmission of a communication signal from a first power level to a second power level further cause the computing device to disable a power amplifier of the transmitter or to cause the power amplifier to convert the communication signal from the first power level to the second power level.

Example 19 may include the subject matter of Example 17, wherein the instructions that cause the computing device to determine whether the output signal provided by the sensor has indicated a change in the external process over a threshold time period further cause the computing device to determine whether the output signal changed from a first logical state to a second logical state over the threshold period of time.

Example 20 may include the subject matter of Example 17, wherein the computing device is one of: a mobile device or a wearable device.

Example 21 is an apparatus for transmission of a communication signal based on sensor fail-safety, comprising: means for receiving an output signal provided by a sensor to monitor a process that is external to the apparatus; means for determining whether the output signal provided by the sensor has indicated a change in the external process over a threshold time period; and means for causing to switch a transmission of a communication signal by a transmitter of the apparatus from a first power level to a second power level that is lower than the first power level, based at least in part on a result of the determining.

Example 22 may include the subject matter of Example 21, wherein the means for causing to switch a transmission of a communication signal from a first power level to a second power level that is lower than the first power level includes means for disabling a power amplifier of the transmitter or initiating the power amplifier to convert the communication signal from the first power level to the second power level.

Example 23 may include the subject matter of Example 22, wherein the means for causing to switch a transmission of a communication signal from a first power level to a second power level includes means for determining that the output signal provided by the sensor has not indicated a change in the external process over the threshold time period.

Example 24 may include the subject matter of Example 22, wherein the means for causing to switch a transmission of a communication signal from a first power level to a second power level includes means for initiating the transmission of the communication signal at the second power level that is within an output signal power range mandated by a governmental regulatory agency for mobile devices.

Example 25 may include the subject matter of Example 21, wherein the apparatus is one of: a mobile device or a wearable device.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A signal transmission apparatus with fail-safe properties, the signal transmission apparatus comprising:
    a transmitter to transmit a communication signal of the signal transmission apparatus at least at a first power level;
    a sensor to monitor a process that is external to the signal transmission apparatus and to provide an output signal indicating a change in a state of the process; and
    a control module communicatively coupled with the sensor and the transmitter, to determine whether the output signal provided by the sensor has indicated a change in the process that is external to the signal transmission apparatus over a threshold time period, and cause the transmitter to switch the transmission of the communication signal from the first power level to a second power level that is lower than the first power level, based at least in part on a result of the determination.

2. The apparatus of claim 1, wherein the sensor is a proximity sensor, wherein the sensor detects proximity of human tissue to the apparatus, wherein the output signal indicates the proximity of the human tissue to the apparatus that is below a threshold distance.

3. The apparatus of claim 1, wherein the sensor is selected from one of: heart rate sensor, temperature sensor, or position sensor, wherein the sensor to monitor the process includes to monitor physiological conditions of a user of the apparatus.

4. The apparatus of claim 1, wherein the communication signal comprises a radio frequency (RF) communication signal, and wherein the second power level is within an output signal power range mandated by a governmental regulatory agency for mobile devices.

5. The apparatus of claim 4, wherein the transmitter includes a power amplifier to convert the RF communication signal from the first power level to the second power level.

6. The apparatus of claim 5, wherein the control module comprises circuitry comprising logic to disable the power amplifier or to cause the power amplifier to convert the RF communication signal from the first power level to the second power level, in response to a determination that the output signal provided by the sensor has not indicated a change in the external process over the threshold time period.

7. The apparatus of claim 6, wherein the circuitry includes a clock counter to determine the threshold time period within which the sensor has not indicated a change in the external process.

8. The apparatus of claim 7, wherein the apparatus is selected from one of: a mobile device or a wearable device, wherein the threshold time period is determined based on information comprising history of use of mobile devices or wearable devices respectively.

9. The apparatus of claim 1, wherein the control module is to determine a status of the sensor based on a result of the determination whether the output signal provided by the sensor has indicated a change in the external process over the threshold time period.

10. The apparatus of claim 9, wherein the sensor is to detect a change in a state of the process, wherein the change in a state of the process includes a difference in a monitored parameter of the process that is above the predetermined threshold.

11. The apparatus of claim 9, wherein the control module is to determine that a status of the sensor is a failed status, in response to the determination that the output signal provided by the sensor has not indicated a change in the external process over the threshold time period.

12. The apparatus of claim 9, wherein the apparatus further comprises at least another sensor to monitor the external process and provide another output signal indicating a change in a state of the process, wherein the control module is to poll the output signal and the other output signal at least over the threshold time period and to determine a status of the sensor and the another sensor based at least in part on a result of the poll.

13. A fail-safe communication method, comprising:
    receiving, at a control module of an apparatus that includes a transmitter to transmit a communication signal and a sensor to monitor a process that is external to the apparatus, an output signal provided by the sensor;
    determining, by the control module, whether the output signal provided by the sensor has indicated a change in the process that is external to the apparatus over a threshold time period; and
    switching, by the control module, a transmission of the communication signal from a first power level to a second power level that is lower than the first power level, based at least in part on the output signal received at the control module.

14. The method of claim 13, wherein causing to switch the transmission of the communication signal from the first power level to the second power level that is lower than the first power level includes disabling a power amplifier of the transmitter or initiating the power amplifier to convert the communication signal from the first power level to the second power level.

15. The method of claim 14, wherein causing to switch the transmission of the communication signal from the first power level to the second power level includes determining, by the control module, that the output signal provided by the sensor has not indicated a change in the external process over the threshold time period.

16. The method of claim 14, wherein causing to switch the transmission of the communication signal from the first power level to the second power level includes initiating, by the control module, the transmission of the communication signal at the second power level that is within an output signal power range mandated by a governmental regulatory agency for mobile devices.

17. One or more non-transitory computing device-readable media having instructions for transmission of a communication signal by a transmitter of a computing device that, in response to execution on the computing device, cause the computing device to:
   receive an output signal provided by a sensor to monitor a process that is external to the computing device;
   determine whether the output signal provided by the sensor has indicated a change in the process that is external to the computing device over a threshold time period; and
   cause the transmitter to switch the transmission of the communication signal from a first power level to a second power level that is lower than the first power level, based at least in part on a result of the determination.

18. The non-transitory computing device-readable media of claim 17, wherein the instructions that cause the computing device to initiate the transmitter to switch a transmission of the communication signal from the first power level to the second power level further cause the computing device to disable a power amplifier of the transmitter or to cause the power amplifier to convert the communication signal from the first power level to the second power level.

19. The non-transitory computing device-readable media of claim 17, wherein the instructions that cause the computing device to determine whether the output signal provided by the sensor has indicated a change in the external process over the threshold time period further cause the computing device to determine whether the output signal changed from a first logical state to a second logical state over the threshold period of time.

20. The non-transitory computing device-readable media of claim 17, wherein the computing device is one of: a mobile device or a wearable device.

* * * * *